(No Model.) 3 Sheets—Sheet 1.

W. M. WOOD & J. C. MILLER.
AUTOMATIC MOTOR STOP.

No. 561,847. Patented June 9, 1896.

WITNESSES:
A. S. Diven
K. K. Mills

INVENTORS
William M. Wood
and James C. Miller
By Eugene Diven
ATTORNEY.

(No Model.) 3 Sheets—Sheet 2.
W. M. WOOD & J. C. MILLER.
AUTOMATIC MOTOR STOP.
No. 561,847. Patented June 9, 1896.
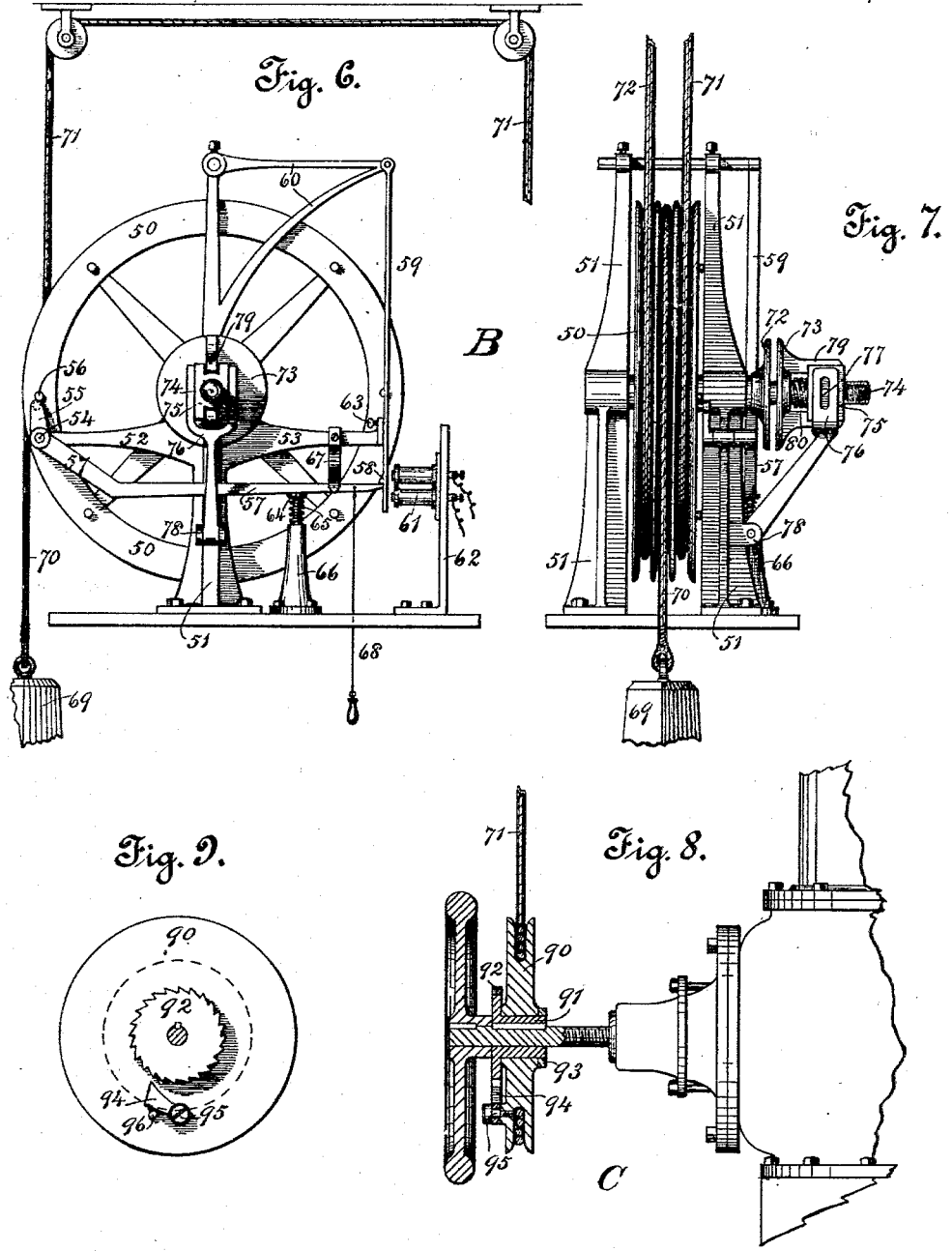
WITNESSES:
A. S. Diven
H. H. Mills
INVENTORS
William M. Wood
and James C. Miller
BY Eugene Diven
ATTORNEY.

(No Model.) W. M. WOOD & J. C. MILLER. 3 Sheets—Sheet 3.
AUTOMATIC MOTOR STOP.

No. 561,847. Patented June 9, 1896.

WITNESSES:
A. S. Diven
H. H. Mills

INVENTORS
William M. Wood
and James C. Miller
By Eugene Diven
ATTORNEY.

UNITED STATES PATENT OFFICE.

WILLIAM M. WOOD AND JAMES C. MILLER, OF ELMIRA, NEW YORK, ASSIGNORS TO THE ELMIRA SAFETY APPLIANCE COMPANY, OF SAME PLACE.

AUTOMATIC MOTOR-STOP.

SPECIFICATION forming part of Letters Patent No. 561,847, dated June 9, 1896.

Application filed October 21, 1895. Serial No. 566,340. (No model.)

*To all whom it may concern:*

Be it known that we, WILLIAM M. WOOD and JAMES C. MILLER, citizens of the United States, residing at Elmira, in the county of Chemung and State of New York, have invented new and useful Improvements in Automatic Motor-Stops, of which the following is a specification.

The object of our invention is to prevent a harmful increase in the speed of prime movers by automatically stopping the motor when it has attained a predetermined speed; and we attain this object by means of a governor attached to the motor itself or to machinery driven by the motor, said governor being arranged to control an electric current, whereby when the speed is attained for which the governor is set a stop mechanism controlled by the electric current is set in motion and the motor stopped. The electric current may at the same time operate a clutch to uncouple the motor.

By way of illustration, in the accompanying drawings we have shown our invention applied to a stationary steam-engine.

Figure 1:
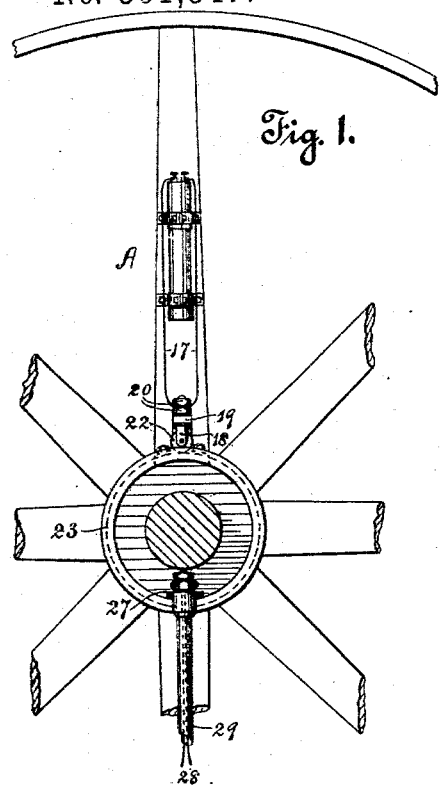
Figure 2:
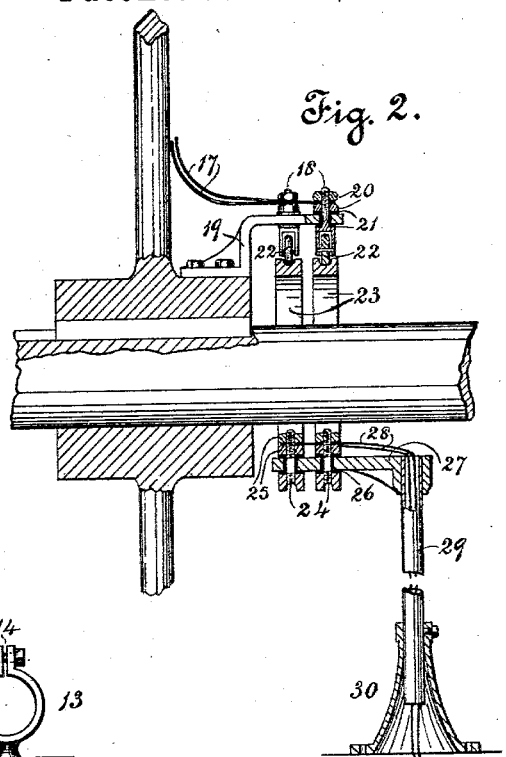
Figure 4:
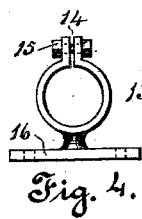
Figure 3:
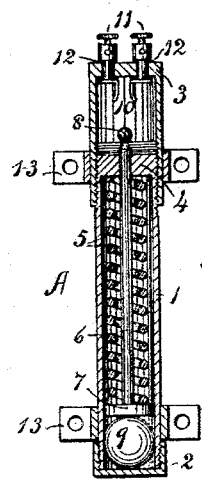
Figure 5:
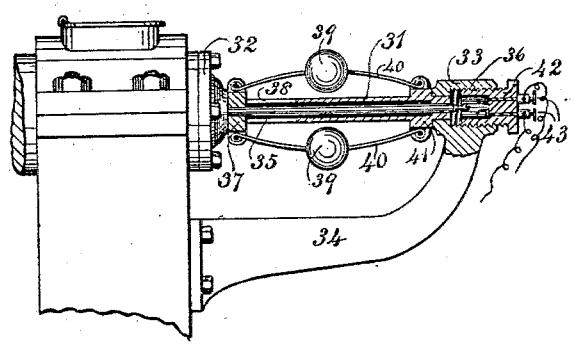
Figure 10:
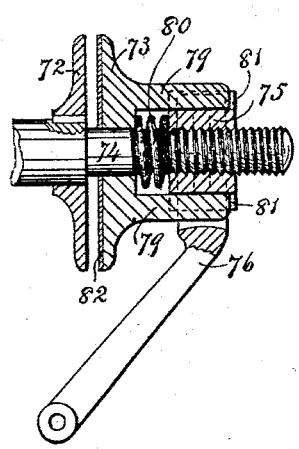
Figure 11:
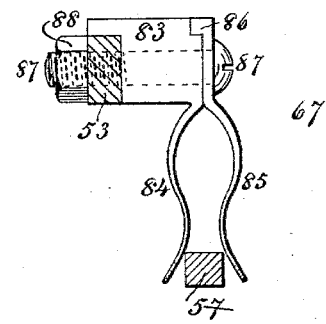
Figure 12:
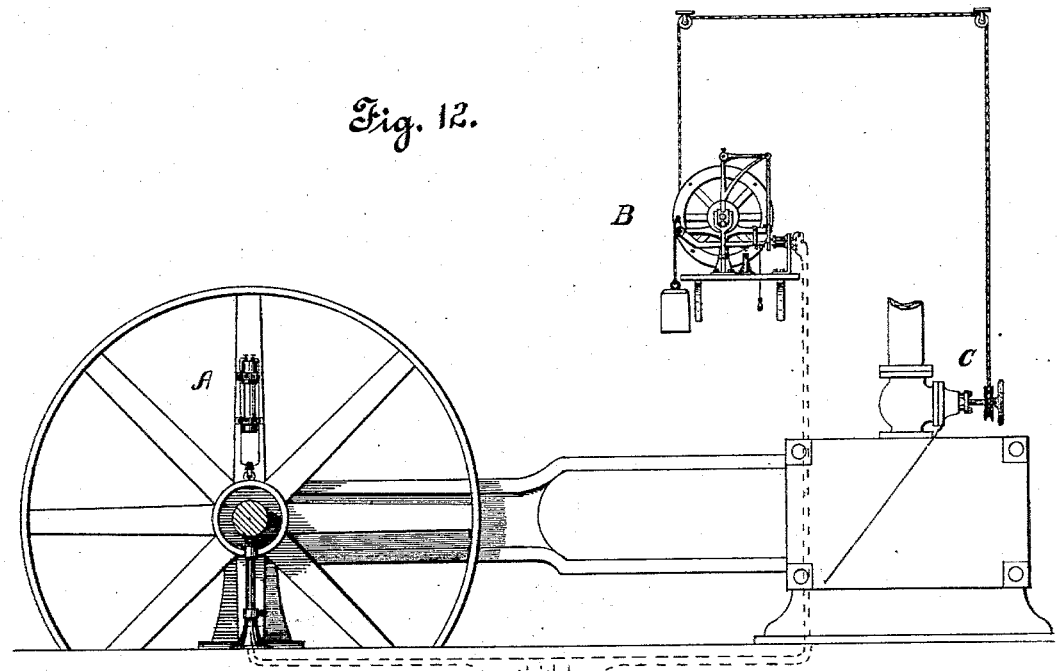

Figure 1 shows the governor in position on the fly-wheel of the engine. Fig. 2 is a vertical cross-section of part of Fig. 1, showing the manner of making electrical connections from the governor to the stationary wires leading to the trip mechanism. Fig. 3 is a vertical cross-section of the governor, showing its internal construction. Fig. 4 is a detail showing a bracket-clamp for attaching governor to fly-wheel. Fig. 5 shows a modification of the governor adapted to be attached to the end of a shaft. Figs. 6 and 7 are side and end elevations, respectively, of the weight-tripping mechanism. Figs. 8 and 9 are sectional views showing one way of connecting the throttle-valve to the operating-weight. Figs. 10 and 11 are details of the tripping mechanism. Fig. 12 is a side elevation showing all the parts of our invention in operative position.

The governor A consists of a cylindrical shell 1, having the caps 2 and 3 screw-threaded upon its ends. At the outer end of the shell is a bridge-piece 4, through which is guided the rod 6. This rod is provided at its inner end with a head 7, between which and the bridge-piece is located a spiral spring 5. A solid metal ball or other suitably-shaped weight 9 is forced outward by centrifugal force due to the rotating fly-wheel, and in its outward movement pushes ahead of it the rod 6 until the knob 8 at the outer end of this rod is forced in between the terminals 10, attached to the binding-posts 11, which are held upon the head of the cap 3 and properly insulated therefrom, as indicated at 12. In this manner an electric circuit is established through connecting-wires, and the trip mechanism is operated at the proper time. The weight 9 operates against the spring 5, and in order to adjust the governor to the required speed of the fly-wheel we cause the terminals to approach or recede from the knob 8 by screwing the cap 3 in the proper direction upon the shell 1. Springs of different degrees of stiffness may be used, so that one size of governor may be adapted to a great range of speeds.

The bracket-clamps 13, Fig. 4, are provided with the base portions 16, which are bolted to the arms of the fly-wheel. Upon loosening the bolt 15 the split portion 14 expands and allows the cap or shell to be turned for the adjustment of the governor, and when the bolts on both clamps are drawn up snug the governor cannot get out of adjustment.

Wires 17 lead from the binding-posts on the governor to studs 18, held in proper positions upon a bracket 19, which in turn is attached to the hub of the fly-wheel. These studs are properly insulated from the bracket, as indicated at 21, and are provided at one end with jam-nuts for attaching the wires and at the other end with trolley-wheels which run in grooves in the circular tracks 23. Brushes may be used in place of the trolley-wheels, if so desired. The circular tracks are held in position by the insulated bolts 24 upon the arm 27, which projects from the tubular upright 29, adjustable vertically in the base-piece 30. Wires 28 are connected to the bolts 24 by the jam-nuts 25, and are led away through the tubular post 29 and along the floor to connect the governor with the battery and magnets of the tripping mechanism. (See Fig. 12.)

In the modification shown in Fig. 5 a tube 31 extends outwardly from a disk 32, bolted to the end of a rotating shaft. The outer end of 31 rotates in the head 33 of the supporting-bracket 34. A rod 35 is centrally guided within the tube 31 and is attached at one end to the cross-head 37, which slides in the slots 38 in the tube. Spring-plates 40 are properly hinged to the cross-head 37 and to the collar 41 upon the tube 31. Midway between the ends of the plates 40 are attached the balls 39, which fly outward upon the rotation of the governor and draw the cross-head 37 toward the outer end of the tube. This pushes the rod 35 outwardly until the knob 36 enters between the terminals attached to the binding-posts 43 and establishes the electric current for operating the tripping mechanism. The binding-posts are attached to the cap 42, which screws into the head 33, so that the governor may be set to operate at different speeds. This style of governor is intended to be used where there is no fly-wheel or where it is inconvenient to use the fly-wheel governor. It may also be placed on the end of a line-shaft or any other driven shaft in any part of a shop.

The tripping mechanism B consists of a grooved wheel 50, supported by two standards 51 upon a shelf attached to the wall of the engine-room. From opposite sides of one of the standards project two arms 52 and 53. In the end of the arm 52 is journaled an arbor 54, to which, on the side toward the wheel, is attached an arm 55, carrying a pin upon which rests another pin 56 on the flange of the wheel. The pin on the arm 55 is held beneath the pin 56 by means of the bent arm 57, attached to the other end of the arbor 54, the free end of this latter arm being held from flying up by a lug 58 on the swinging armature 59, which hangs from the bracket 60, projecting from one of the standards 51.

Electromagnets 61, held in proper position upon the upright 62, when energized by the electric current established by the governor, draw the armature away from the end of the arm 57 and allow it to fly up. This releases the wheel 50 and allows it to turn, and the weight 69, attached thereto by the wire cord 70, to run down and wind upon the wheel the shut-off cords 71 and 72. In order to prevent the arm 57 from dropping back, and so bringing the pin on arm 55 into contact with the pins on the wheel while it is turning, we provide a spring-catch 67. (See Fig. 11.) This consists of the piece 83, extending outwardly from the arm 53 and provided with the depending spring-jaw 84. A second spring-jaw 85 is fastened to the outside of 83, being held from turning thereupon by the notched portion 86, and the whole being bolted to the arm 53 by the bolt 87, fastened by the jam-nut 88.

When the trip is to be reset, the wheel 50 is turned back the proper distance, the arm 57 is pulled down by the cord 68 until the lug 58 on the armature swings over the end of the arm, the cord 68 is released, and the head 64 of the rod in the standard 66, pressed by the spring 65, pushes the arm 57 up against the lug 58. The wheel 50 is then released and the pin 56 comes to rest against the pin on the arm 55. It will be noticed that the pin 56 is not directly above the pin on the arm, but a little inside of it, so that it presses outward upon the arm and moves it aside the instant the arm 57 is released. The throw of the armature 59 is regulated by the thumb-screw 63.

In order to prevent the weight coming to the end of its fall with a shock, to the injury of the valve and other parts of the mechanism, we provide a brake, as shown in Figs. 6, 7, and 10. A disk 72 is keyed to the shaft of the wheel 50, and beyond this disk the shaft is reduced and screw-threaded, as shown at 74. A second disk 73 is fitted loosely upon the extension 74 and is provided with the arms 79, which fit in grooves 81 in the upper and lower sides of the nut 75. This nut has its sides squared to receive the yoke of the arm 76, which is slotted to receive pins projecting from said sides. The arm 76 is pivoted at 78 to one of the standards 51. This arm prevents the nut and disk 73 from turning, so that when the weight 69 is running down the nut is screwed in toward the disk 72, pressing the disk 73 ahead of it through the medium of the spring 80 until the disk 73 is pressed against the disk 72 with gradually increasing friction and the weight is brought to a standstill without shock. A facing of leather or other suitable material is attached to the disk 73, as shown at 82, the better to produce the necessary friction. The brake is set so as to bring the descending weight to a stop at the moment the throttle-valve is closed.

We have shown our invention as applied to an engine having a throttle-valve with screw-threaded valve-stem. Here it is necessary that the hand-wheel and valve-stem shall be operative independently of the closing device, and that the closing device shall act upon the valve-stem at whatever extent the valve is opened immediately the weight is tripped. To accomplish this, we provide the construction C shown in Figs. 8 and 9. The cord 71 from the wheel 50 is led over properly-located pulleys and finally attached to the grooved wheel 90 and wound thereupon. The wheel 90 is loose upon the hub 91 of the ratchet-wheel 92, being held in place by the collar 93. The hub of the ratchet-wheel is keyed to the valve-stem. A pawl 94 is pivoted to the face of the wheel 90 by the stud 95 and is held in place by the pin 96. In operation, when the stopping mechanism is all set, the wheel 90 remains stationary, due to the weight of the pawl 94 or to an additional weight attached to the opposite face of the wheel if the weight of the pawl is not sufficient, so that the engineer may start or stop his engine at pleasure and without disturbing the stopping mechanism. However, when the governor acts and the cord 71 is pulled by the descending weight the wheel 90 turns until the pawl drops into the ratchet-wheel 92, when the valve is screwed home and the engine stopped. A coiled spring may be inserted in the cord 71 to allow the weight to complete its drop should the mechanism act when the throttle-valve is only partially opened.

We have shown the wheel 50 provided with a second cord 72, which may run to the device for uncoupling a line-shaft and setting a brake thereupon, covered by Letters Patent No. 297,529, issued to William M. Wood on May 16, 1893. We also propose to run wires from the magnets on the tripping mechanism to various parts of a building and provide push-buttons in convenient places, so that the engine may be stopped independently of the governor.

We do not wish to be understood as limiting ourselves in any way to the specific mechanism shown and described, as it is obvious that many variations and changes may be made without departing from the spirit of our invention. In adapting our invention to different kinds of motors in differently-arranged shops and factories many changes will of necessity have to be made, all of which, however, will readily occur to the mind of an ordinarily skilful mechanic after the present disclosure.

The invention is as well adapted to hydraulic, electric, and other motors as to the steam-engine taken for the purpose of illustration.

What we do claim as our invention, and desire to secure by Letters Patent, is—

1. In an automatic motor-stop, a governor made up of the following instrumentalities; a shell or case adapted to be attached to a rotating part, a rod within the shell acted upon by a weight thrown out by centrifugal force, one end of said rod being adapted to strike the terminals of an electric circuit, and means for adjusting the distance between the terminals and the end of the rod, substantially as shown and described.

2. In an automatic motor-stop, a governor made up of the following instrumentalities; a shell provided with caps at its ends, a bridge across one end of the shell, a rod guided therethrough, a head on one end of the rod and a spring between the bridge and the head, a weight adapted to be pressed against the head by centrifugal force, a knob on the free end of the rod, terminals of an electric circuit projecting toward the knob from binding-posts on the head of one of the caps, said cap being adjustable longitudinally upon the shell, and bracket-clamps adapted to hold the governor in proper adjustment upon the arm of a fly-wheel or pulley, substantially as shown and described.

3. In an automatic motor-stop in combination, a governor, substantially as described, attached to the arm of a fly-wheel or pulley, wires running from said governor to a bracket on the hub of said fly-wheel or pulley, studs projecting through said bracket and insulated therefrom, means for attaching the wires to said studs, means for establishing a contact between said studs and stationary rings held in position by a standard and insulated therefrom and from each other, and wires leading from said rings to a stopping mechanism, substantially as shown and described.

4. In an automatic motor-stop, in combination, a grooved drum mounted upon suitable standards, a weight attached to said drum by a cord wound in one of the grooves thereof, pins on the drum adapted to engage a pin on an arm attached to an arbor supported by the standard, a second arm attached to said arbor, a swinging armature provided with a lug for engaging the free end of said second arm, a spring to press said arm against said lug, electromagnets to actuate the armature to release said arm, means for holding said arm in its released position, a governor in electric circuit with said magnets, and a cord running from the drum to mechanism whereby the motor fluid is shut off, substantially as shown and described.

5. In an automatic motor-stop, in combination, a drum supported upon standards, a weight attached to said drum by a cord wound in a groove therein, other cords attached to other grooves in said drum and leading to stop mechanisms, electrically-controlled tripping devices whereby the drum is released, and a brake arranged to automatically reduce the speed of the drum before the weight reaches the end of its fall.

6. The combination with a weight-actuated drum, of a brake consisting of a disk keyed to the shaft of said drum, a second disk loosely mounted upon an extension of said shaft, said second disk being held from turning and gradually pressed against said first-mentioned disk, by means substantially as described, whereby the speed of the rotating drum may be gradually decreased.

7. The combination with a rotatable drum of a brake consisting of a disk keyed to the shaft of the drum, a second disk loosely mounted upon an extension of said shaft, a friction facing upon said second disk, a nut-screw threaded upon said extension and provided with grooves, arms projecting from said second disk and sliding in said grooves, a spring interposed between said second disk and the nut, and an arm pivoted to the drum standard and provided with a yoke to engage the sides of the nut and prevent it from turning, substantially as shown and described.

8. In a motor-stop in combination, a spindle for actuating a shut-off, a wheel loosely mounted upon said spindle, driving mechanism connected to said wheel to rotate it and a locking device whereby the wheel is locked to the spindle and the spindle is made to turn thereby when the driving mechanism is set in motion, the locking device being so constructed that the spindle shall at all other times be free to be operated independently of the driving mechanism.

9. In an automatic motor-stop, in combination, a weight-actuated drum, electrically-controlled tripping devices therefor, a cord attached to said drum and running over suitably-located pulleys to a grooved wheel mounted upon a valve-stem, and means substantially as described for automatically throwing the wheel into engagement with the valve-stem when the drum is set in motion.

10. In a stop mechanism, the combination with a valve-stem, of a ratchet-wheel keyed thereto, a grooved wheel loosely mounted on the hub of the ratchet-wheel, a weight-actuated cord wound upon the grooved wheel and attached thereto, and a pawl upon said wheel adapted to fall into and engage the teeth of the ratchet-wheel when the weight is set in motion, substantially as shown and described.

WILLIAM M. WOOD.
JAMES C. MILLER.

Witnesses:
JOE H. GEER,
CHAS. J. MAYO.